United States Patent
Wirt

(10) Patent No.: US 7,127,160 B2
(45) Date of Patent: Oct. 24, 2006

(54) LENS MODULE ASSEMBLY METHOD AND ASSEMBLY INTERMEDIATE

(75) Inventor: Michael L. Wirt, Avon, NY (US)

(73) Assignee: Eastman Kodak Company, Rochester, NY (US)

( * ) Notice: Subject to any disclaimer, the term of this patent is extended or adjusted under 35 U.S.C. 154(b) by 215 days.

(21) Appl. No.: 10/949,628

(22) Filed: Sep. 24, 2004

(65) Prior Publication Data

US 2006/0067658 A1   Mar. 30, 2006

(51) Int. Cl.
G03B 17/00 (2006.01)
G02B 7/02 (2006.01)

(52) U.S. Cl. .......................... 396/6; 396/529; 359/819

(58) Field of Classification Search ................. 396/6, 396/529, 530; 359/819
See application file for complete search history.

(56) References Cited

U.S. PATENT DOCUMENTS 5,831,777 A * 11/1998 Iwasa ........................ 359/826
6,205,293 B1 * 3/2001 DiRisio et al. ................ 396/6

* cited by examiner

Primary Examiner—W. B. Perkey
(74) Attorney, Agent, or Firm—Robert Luke Walker

(57) ABSTRACT

In a lens module assembly method, a lens holder is placed in a receiver. The lens holder has a nest. A lens element is deposited in the lens holder. During the depositing, the lens element seats in the nest, if the lens element is in a forward-facing orientation. Entry of the lens element into the nest is interrupted, if the lens element is in a rearward-facing orientation.

20 Claims, 4 Drawing Sheets

LENS MODULE ASSEMBLY METHOD AND ASSEMBLY INTERMEDIATE

FIELD OF THE INVENTION

The invention relates to photographic cameras and lens modules and more particularly relates to assembly of lens modules.

BACKGROUND OF THE INVENTION

Lens modules for one time use cameras and other optical devices are commonly made by assembling lens components, such as optical elements and aperture stops into a holder and attaching a retainer to hold the lens components in place. The assembly can be manual or automated. In both cases, mistakes can be made as to the orientation of individual optical elements. Such mistakes can occur during placement in the lens module or during an earlier step. For example, an individual lens element can have been positioned upside down in a rack or the like, which feeds an automated assembly tool. Once the lens module is assembled, it is not immediately apparent that one or more optical elements may have been reversed. Optical testing and other methods can be used to determine if the placement is correct. These methods tend to be cumbersome and add cost.

It would thus be desirable to provide improved lens module assembly methods and assembly intermediates, in which incorrect lens placement can be simply and easily prevented.

SUMMARY OF THE INVENTION

The invention is defined by the claims. The invention, in broader aspects, provides a lens module assembly method, in which a lens holder is placed in a receiver. The lens holder has a nest. A lens element is deposited in the lens holder. During the depositing, the lens element seats in the nest, if the lens element is in a forward-facing orientation. Entry of the lens element into the nest is interrupted, if the lens element is in a rearward-facing orientation.

It is an advantageous effect of the invention that an improved lens module assembly methods and assembly intermediates, in which incorrect lens placement can be simply and easily prevented.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
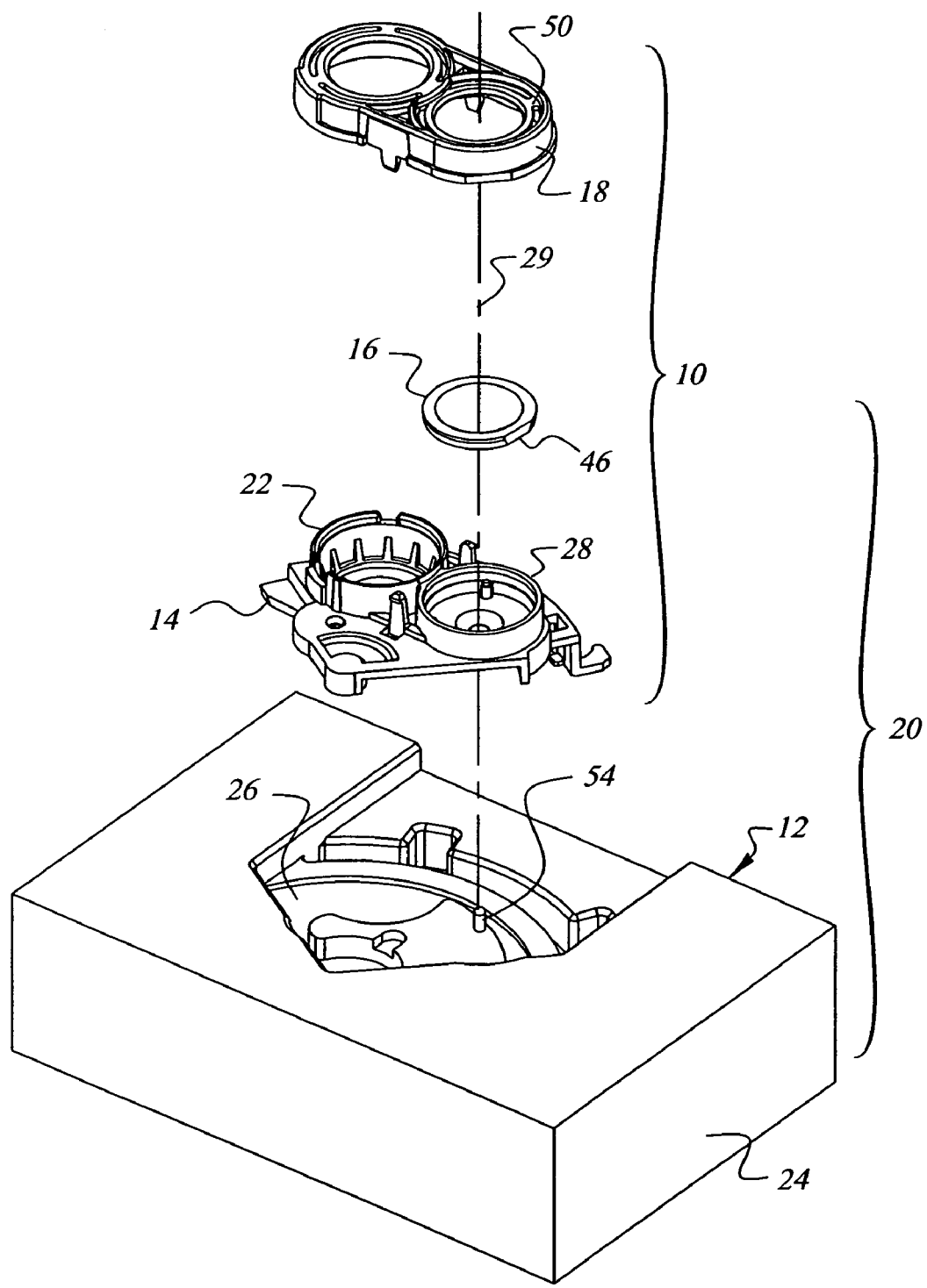
FIG. 1 is an exploded perspective view of an embodiment of the assembly intermediate.
Figure 2:
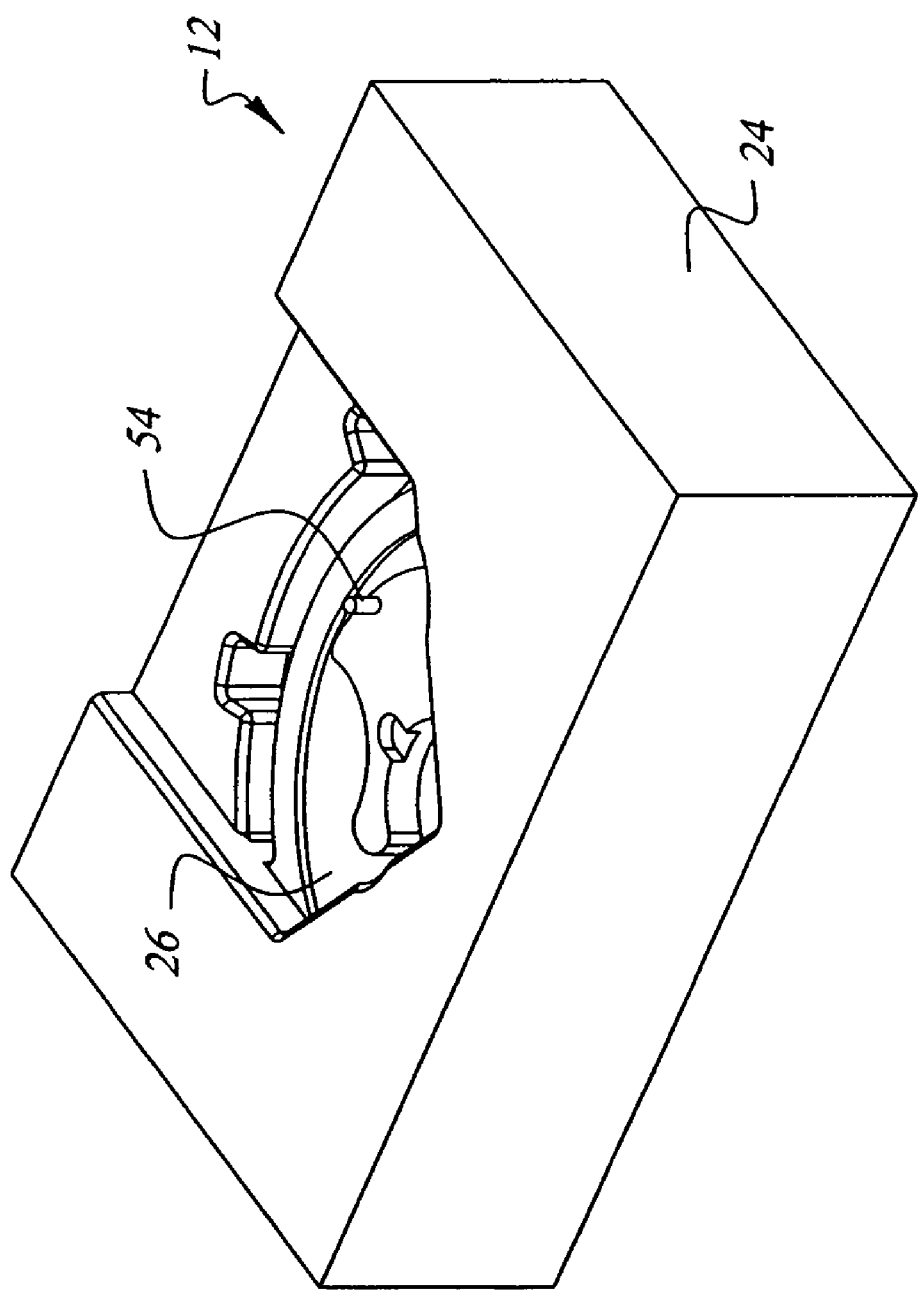
FIG. 2 is a perspective view of the fixture of the assembly intermediate of FIG. 1.

In the methods herein, a lens module 10 is assembled using a fixture 12. The lens module 10 has a lens holder 14, which is received by the fixture 12, a lens element 16, and a lens retainer 18. When the lens module 10 is completed, the lens retainer 18 is connected to the lens holder 14 and holds the lens element 16 in place.

The term "assembly intermediate" is used herein to refer to an assembly of a fixture 12 and the lens holder 14, with or without the assembled lens element 16 and a lens retainer 18. The assembly intermediate 20 illustrated in the figures is produced during assembly of a lens module 10 of a one-time use camera. The assembly intermediate 20 can produced and retained in one location or can be transported manually or on a moving conveyor or the like (not shown). The assembly intermediate 20 is convenient for transport, particularly after the lens module 10 is completed, since the lens module 10 is held in a known orientation and position on the fixture 12 and is protected by the fixture 12 from impacts in several directions. In that case, the assembly intermediate 20 is moved to a new location, at which the lens module 10 is removed and the fixture 12 is returned for reuse. The removed lens module 10 can be installed in a camera frame, packaged for sale, or the like.

In the illustrated embodiment, the lens element 16 is a single element lens (a telephoto singlet lens). Within the constraints discussed herein, the lens element 16 can be modified and other lens elements can be provided, which would lie forward of the lens element 16 shown, that is, in a direction outward from the lens holder 14. The illustrated lens holder 14 has a nest 28 for the lens element 16 and a secondary site 22 for an additional lens having one or more components (not illustrated). The secondary site 22 can duplicate features of the nest 28 discussed here and the fixture 12 can likewise be modified with duplicate features. (This is not illustrated.)

Referring again to the figures, the fixture 12 has a base 24 and a receiver 26 that is recessed within the base 24. The receiver 26 faces outward. The receiver 26 is configured so as to closely accept the lens holder 14. The receiver 26 and lens holder 14 have complex shapes that permit the receiver 26 to accept the lens holder 14 in only a single orientation relative to the fixture 12. Complementary shapes reduce the risk of contaminants remaining in the receiver 26 during use and scratching or otherwise damaging the lens module 10. The lens holder 14 is movable vertically in and out of the receiver 26, and is held in place by gravity. Other movement is blocked due to the complementary shapes and close fit of the receiver 26 and the lens holder 14.

The receiver 26 of the fixture 12 defines an optical axis 29. A nest 28 of the lens holder 14 also defines an optical axis 29, as does the lens element 16. When the lens module 10 is assembled on the fixture 12, all of these optical axes coincide. When the term "optical axis" is used herein in reference to relative locations, it will be understood that the locations can be determined with reference to the optical axis 29 of an assembly intermediate 20 having a completed lens holder 14.

The nest 28 of the lens holder 14 has a seat 30 and an outer wall 32 surrounding the seat 30. The outer wall 32 extends forward in a direction parallel to the optical axis 29 to a rim 34. The seat 30 receives the lens element 16. The lens element 16 and nest 28 are configured such that the lens element 16 will settle against the seat 30, under the action of gravity, when the lens element 16 is deposited in the nest 28 and the lens element 16 is in the correct orientation. The nest 28 is capable of accepting the lens element 16 in either the forward-facing orientation or the rearward-facing orientation, when the lens holder 14 is free of the receiver 26.

The lens element 16 has a pair of opposed optical surfaces 36,38 and a collar 40 that extends outward from the optical surfaces 36,38 in a direction radial to the optical axis 29. Light is propagated through the optical surfaces 36,38 during use. The optical surfaces 36,38 are described herein as "forward" and "rearward". The term "forward" is in a direction outward from the receiver 26, along the optical axis 29, when the lens element 16 is seated in the nest 28. The term "rearward" indicates the opposite direction. The correct orientation for the lens holder 14 in the nest 28 is with the forward surface 36 facing outward from the receiver 26. ("Forward" and "rearward" are arbitrary in relation to ultimate use of the lens module 10. In the embodiment shown, the front of the lens element in a finished camera is the forward surface, but this is not limiting.)

The collar 40 is annular in shape. The collar 40 has an engagement portion 42 that contacts the seat 30 of the nest 28 and a periphery 44 that contacts the wall 32, when the lens element 16 is seated in the lens holder 14. The collar 40 and the nest 28 can include features that require the lens element 16 to be rotated about the optical axis 29 to a particular orientation, in order to seat in the nest 28. For example, the collar 40 can have a flat 46 (shown in FIG. 1) and the nest 28 wall 32 a complementary protrusion (not shown). Such features can help prevent rotation of the lens element 16, during use.

The rearward optical surface 38 is concavely curved and defines a recess 48. The rearward optical surface 38 is located forward of the engagement portion 42 of the collar 40, when the lens element 16 is seated in the lens holder 14. In the embodiment shown, the forward optical surface 36 is located forward of the collar 40, when the lens element 16 is seated in the lens holder 14.

The forward optical surface 36 is less recessed than the rearward optical surface 38. In other words, the forward optical surface 36 can be convex or flat or a flatter concave curve than the rearward optical surface 38.

In the completed lens module 10, the lens element 16 is held against the seat 30 by the lens retainer 18. In the illustrated embodiment, the lens retainer 18 is snapped to the lens holder 14. The seat 30 of the nest 28 can have raised datum pads (not shown) that provide three point support for the lens element 16. The lens element 16 is held against the datum pads by a constant inward bias provided a resilient flex ring 50 that is part of the lens retainer 18.

The optical axis 29 extends out through an opening 52 in the nest 28 of the lens holder 14, when the lens holder 14 is loaded in the receiver 26. An interference member 54 extends outward from the receiver 26 through the opening 52 into the interior of the nest 28. The interference member 54 has a free end 56 that is located in the recess 48, rearward from the rim 34 of the nest 28. In the embodiment shown, the interference member 54 is coaxial with the optical axis 29. The interference member 54 can be off-center, but the coaxial location maximizes the extent that the interference member 54 can protrude into the recess and helps accommodate manufacturing tolerances of the lens holder 14.

Figure 3:
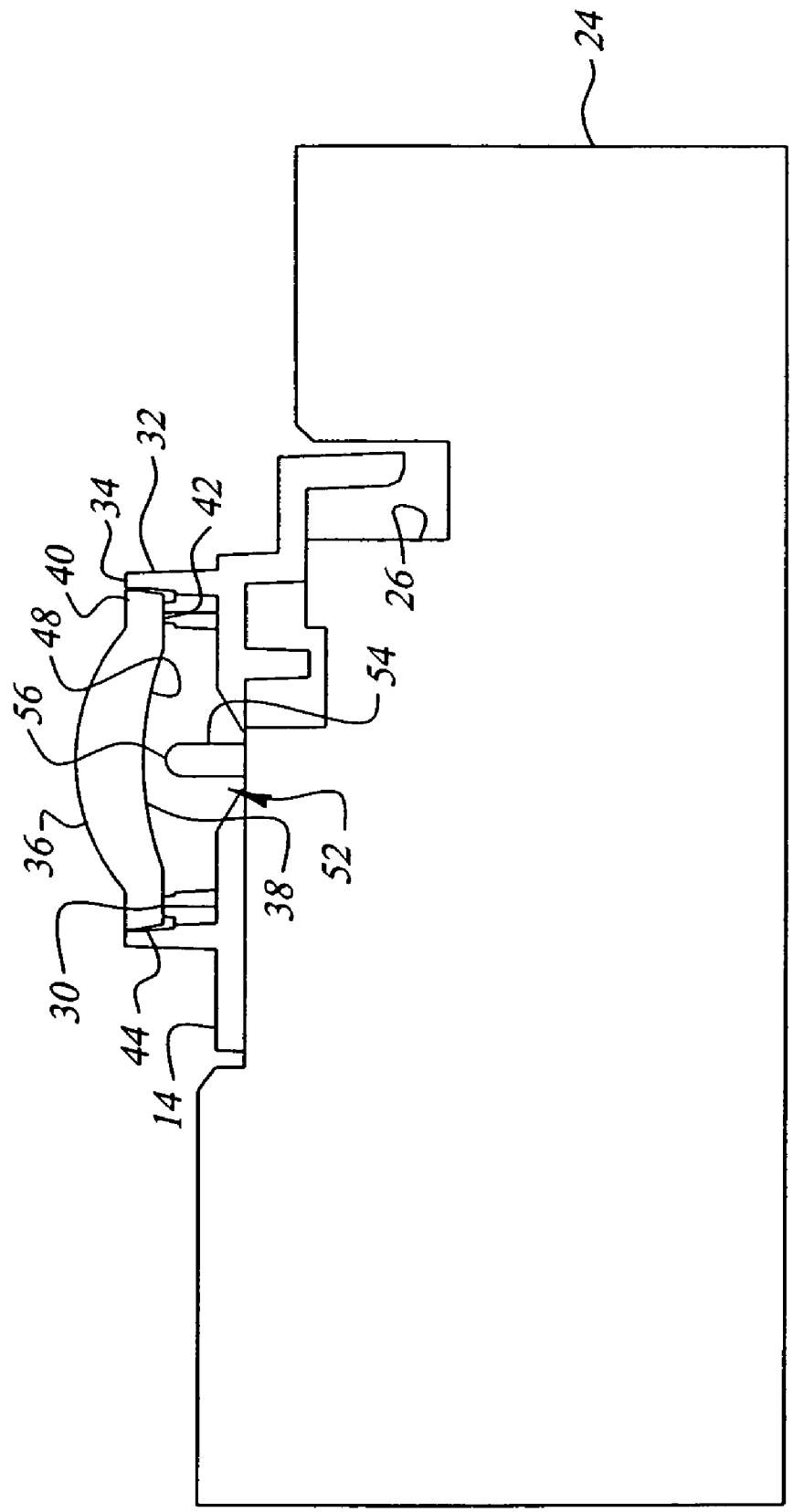
FIG. 3 is a cross-sectional view of the assembly intermediate of FIG. 1 taken along a line corresponding to line 3—3 of FIG. 2. The lens element is shown in a forward-facing orientation.

In the method, the lens holder 14 is placed in the receiver 26 and the lens element 16 is deposited in the lens holder 14. If the lens element 16 is in a forward-facing orientation during depositing, the lens element 16 seats in the nest 28, as shown in FIG. 3. If the lens element 16 is in a rearward-facing orientation during depositing, the entry of the lens element 16 into the nest 28 is interrupted, by the free end 56 of the interference member 54, which physically blocks the lens element 16 from seating in the nest 28. (It is preferred that the free end 56 is non-abrasive to avoid damage to the lens element 16.)

When loaded in a forward-facing orientation, the concavely curved rearward optical surface 38 adjoins the free end 56 of the interference member 54. During seating, the lens element 16 approaches, but does not contact the interference member 54. On the other hand, when the lens element 16 is loaded in a misoriented, rearward-facing orientation, the forward optical surface 36 contacts the interference member 54. This is due to the shape of the forward optical surface 36 (in the drawings the forward optical surface 36 is convexly curved). In manual loading, the misorientation can be seen and felt, and in automatic loading, can be detected by component position or resistance to movement. For example, the interference member 54 can be biased outwardly by a spring (not shown). Compression of the spring indicates contact with the interference member 54.

Figure 4:
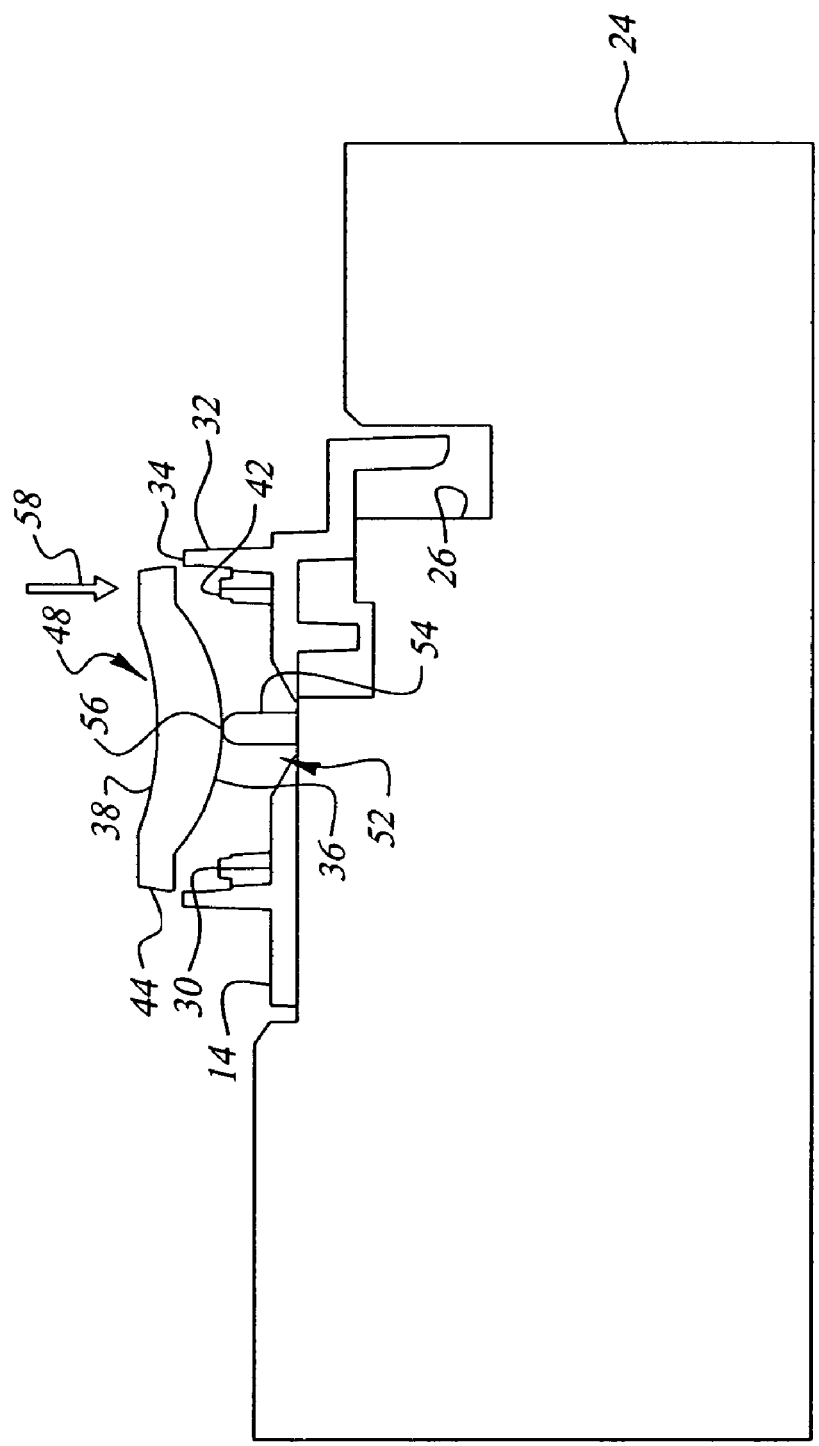
FIG. 4 is the same view as FIG. 3, except that the lens element is shown in a rearward facing orientation.

Loading of the lens element 16 in the rearward-facing orientation, can be stopped prior to removal of the lens element 16. In this case, the lens element 16 is supported in an unseated position, shown in FIG. 4, by the nest 28 and the interference member 54. This position can be readily detected optically or tactilely or by a like sensor, since the lens element 16 is in a more forward position, than when the lens element 16 is seated. The lens element 16 also tends to rest at an angle to a plane perpendicular to the optical axis 29. The lens element 16, in this position, blocks (indicated by arrow 58 in FIG. 4) attachment of the lens retainer 18 to the lens holder 14, thus assembly cannot continue. On the other hand, the lens element 16 can be readily grasped, reoriented to the correct orientation, and redeposited in the correct orientation. With the lens element 16 seated, the lens retainer 18 can then be attached.

The invention has been described in detail with particular reference to certain preferred embodiments thereof, but it will be understood that variations and modifications can be effected within the spirit and scope of the invention.

The invention claimed is:

1. A lens module assembly method comprising the steps of:
    placing a lens holder in a receiver, said lens holder having a nest;
    depositing a lens element in said lens holder;
    during said depositing, seating said lens element in said nest when said lens element is in a forward-facing orientation;
    during said depositing, interrupting entry of said lens element into said nest when said lens element is in a rearward-facing orientation.

2. The method of claim 1 wherein said interrupting further comprises physically blocking said lens element from said nest, when said lens element is in said rearward-facing orientation.

3. The method of claim 2 wherein said blocking further comprises contacting an interference member with a convexly curved optical surface of said lens element.

4. The method of claim 3 wherein said seating further comprises approaching said interference member with a concavely curved optical surface of said lens element.

5. The method of claim 3 further comprising supporting said lens element in an unseated position following said interrupting.

6. The method of claim 3 wherein said depositing is automatic and said method further comprises detecting said contacting.

7. The method of claim 1 further comprising supporting said lens element in an unseated position following said interrupting.

8. The method of claim 7 further comprising, following said supporting, reorienting said lens element to said forward-facing orientation and repeating said depositing.

9. The method of claim 1 further comprising attaching a lens retainer on said lens holder following said seating; and preventing attachment of said lens retainer on said lens holder following said interrupting.

10. The method of claim 9 wherein said preventing further comprises physically blocking attachment of said lens retainer with said lens element.

11. The method of claim 1 wherein said nest is capable of accepting said lens element in both said forward-facing orientation and said rearward-facing orientation, when said lens holder is free of said receiver.

12. A lens module assembly method comprising the steps of:
  placing a lens holder in a receiver of a fixture, said lens holder having a nest having an opening, said fixture having an intrusion member extending outward from said receiver through said opening;
  depositing a lens element in said lens holder, said lens element having forward and rearward optical surfaces and a support portion, said rearward optical surface being concavely curved and defining a recess, said forward optical surface being less-recessed than said rearward surface;
  during said depositing, seating said lens element in said nest wherein said intrusion member extends into said recess and closely adjoins said rearward optical surface.

13. The method of claim 12 wherein said seating further comprises engaging an annular collar of said lens element and a seat of said nest, said annular collar being disposed rearward of said forward optical surface.

14. The method of claim 13 wherein said forward optical surface is convexly curved.

15. The method of claim 13 wherein said nest is capable of accepting said lens element in both said forward-facing orientation and said rearward-facing orientation, when said lens holder is free of said receiver.

16. An assembly intermediate comprising:
  a fixture having a base, a receiver recessed in said base, and an interference member extending outward from said receiver, said receiver defining an optical axis, said interference member having a free end spaced outward from said receiver in a direction parallel to said optical axis;
  a lens holder closely held in said receiver, said lens holder having a nest aligned with said optical axis, said nest having a central opening and a rim disposed outward of said central opening in a direction parallel to said optical axis, said interference member extending through said opening into said nest, wherein said free end is disposed within said nest, interior to said rim.

17. The assembly intermediate of claim 16 further comprising a lens element seated in said nest, said lens element having a concavely curved optical surface closely adjoining said free end of said interference element.

18. The assembly intermediate of claim 17 further comprising a lens retainer attached to said lens holder, said lens retainer holding said lens element in said nest.

19. The assembly intermediate of claim 16 further comprising a lens element supported by said nest and said interference element in an unseated position.

20. The assembly intermediate of claim 19 wherein said lens element has a convexly curved optical surface in contact with said interference element.

* * * * *